March 13, 1962 R. L. DEW ETAL 3,025,053

COPYLOADER FOR A FACSIMILE TRANSMITTER

Filed Sept. 16, 1960 6 Sheets-Sheet 1

INVENTORS
Robert L. Dew.
Walter W. Kuklinski
John Zabouski

By A. G. Douvas
Attorney

INVENTORS
Robert L. Dew
Walter W. Kukilnski
John Zabouski

By A. G. Douvas
Attorney

March 13, 1962 R. L. DEW ET AL 3,025,053

COPYLOADER FOR A FACSIMILE TRANSMITTER

Filed Sept. 16, 1960

6 Sheets-Sheet 3

INVENTORS
Robert L Dew
Walter W. Kuklinski
John Zabouski

By A. G. Douras
Attorney

March 13, 1962 R. L. DEW ETAL 3,025,053
COPYLOADER FOR A FACSIMILE TRANSMITTER
Filed Sept. 16, 1960 6 Sheets-Sheet 4

INVENTORS
Robert L. Dew
Walter W. Kuklinski
John Zabouski

By A. G. Douras
Attorney

INVENTORS
Robert L. Dew
Walter W. Kuklinski
John Zabouski

By A. G. Douvas
Attorney

INVENTORS
Robert L. Dew
Walter W. Kuklinski
John Zabouski

By A. G. Douvas
Attorney 3,025,053

COPYLOADER FOR A FACSIMILE TRANSMITTER

Robert L. Dew, Bensonville, Walter W. Kuklinski, Mount Prospect, and John Zabouski, Cicero, Ill., assignors to Stewart-Warner Corporation, Chicago, Ill., a corporation of Virginia Filed Sept. 16, 1960, Ser. No. 56,492
16 Claims. (Cl. 271—33)

This invention relates to improved apparatus for automatically and continuously feeding sheets of paper to a facsimile transmitter for detection and transmission of information carried thereon.

In the operation of facsimile transmitters, it has been common to feed succeeding sheets of paper, blue prints, photographs, etc. to the transmitter manually. Some attempts have been made to automatically feed this "copy" into the apparatus. However, for various reasons, no commercially satisfactory copyloader which is sufficiently economical and reliable has been put into use.

Accordingly, it is a primary object of the present invention to provide an economical, yet reliable, means for automatically feeding copy to a facsimile transmitter.

It is another object of the present invention to provide a simplified means for picking up sheets of paper, one at a time, for feed into a facsimile transmitter.

It is another object of the present invention to provide improved mechanical and electrical means preventing damage to the copyloader and providing operation of the copyloader in synchronism with the operation of the transmitter.

It is another object of the present invention to provide a simplified, yet reliable, means for assuring proper alignment of the copy with the means for picking up the copy for delivery to the transmitter.

A feature of the present invention is the provision of a ball and spring clutch mechanism preventing damage to the copyloader.

A feature of the present invention is the use of replaceable rolls of masking tape for reliably picking up the copy and for releasing the copy once it is received by the transmitter.

Other objects and features of the invention will be evident upon a perusal of the following description, taken in conjunction with the accompanying drawings, in which.

Figure 11:
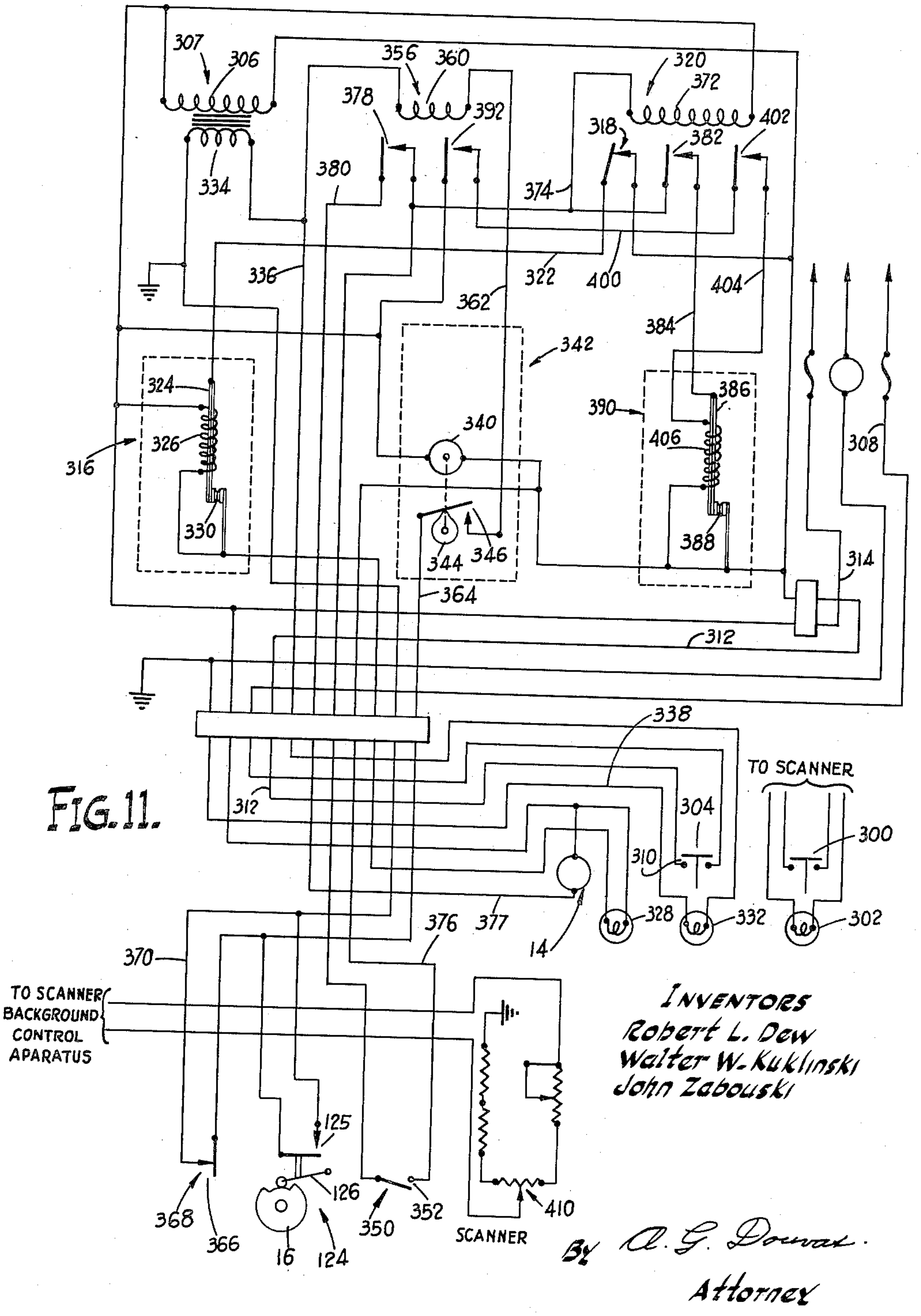

FIGS. 7, 8, 9, and 10 are perspective, front elevation, side elevation, and sectional views showing details of the improved means for seizing and releasing the copy; and FIG. 11 is a schematic diagram of the circuit for operating the copyloader in conjunction with the transmitter.

The improved copyloader of the present invention has been particularly adapted for use with facsimile transmitters of the type sold by Stewart-Warner Corporation as models FT–11 and FT–12. It will be appreciated, however, that the improved apparatus is capable of use with other types of transmitters without substantial change, and the invention is to be limited only by the scope of the claims appended hereto.

Typical facsimile transmitters will accept continuous copy as well as individual sheets. No substantial transmitter feed problem is encountered with continuous copy inasmuch as once the copy is manually loaded, the transmitter operates automatically for a substantial period of time without requiring manual handling. On the other hand, when individual sheets, such as letters, photographs, blue prints and the like are fed to the transmitter, a serious labor cost is encountered if the transmitter must be fed manually. It is to this latter problem to which applicants' invention is directed.

In the typical transmitter T, the sheet of paper to be scanned for information is centered face up and advanced into the machine until a lamp (not shown) lights to indicate that the machine will automatically feed the paper thereafter. The paper is advanced automatically past a pair of green fluorescent lamps L centered above and below a lamp box slot S1.

As the succeeding portions of the paper pass the slot, optical and electronic apparatus within the transmitter automatically scans information on the paper in a well known manner. For example, a mirror M directs a horizontal portion of the image on the paper to an objective lens O. The lens enlarges the image and properly focuses it at a disc D2 for application to a photomultiplier tube P. A disc D1 having a coarse single spiral slit, a horizontal slit S2 of .003″ height, and the disc D2 having a fine 5-turn spiral slit cooperate in a well known manner to provide horizontal scan, i.e., applying horizontally succeeding .003″ by .003″ portions of the image to the tube P. Movement of the paper provides the vertical scanning. A collector system C gathers the small image portions and focuses them in time sequence on the photosensitive cathode of the tube T.

Signals corresponding to the scanned information are transmitted to a remote facsimile receiver which reproduces the information in a well known manner. After scanning, the sheet leaves the machine and falls into a copy tray.

The improved copyloader of the present invention includes a sheet metal cabinet 2 having a pair of sheet metal side walls 4 and 6 secured thereto by welded lugs of a rear panel or plate 9. The forward portion of the cabinet includes a control panel 8. A paper storage and guide assembly 10 is located between the side walls above and to the rear of the control panel. A paper seizing and releasing assembly 12 is provided above and to the rear of the assembly 10. The upper end of the rear panel is hooked at 11 to secure the copyloader to the transmitter. Screws (not shown) may be used to hold the copyloader rear panel on the transmitter.

Figures 4, 5:
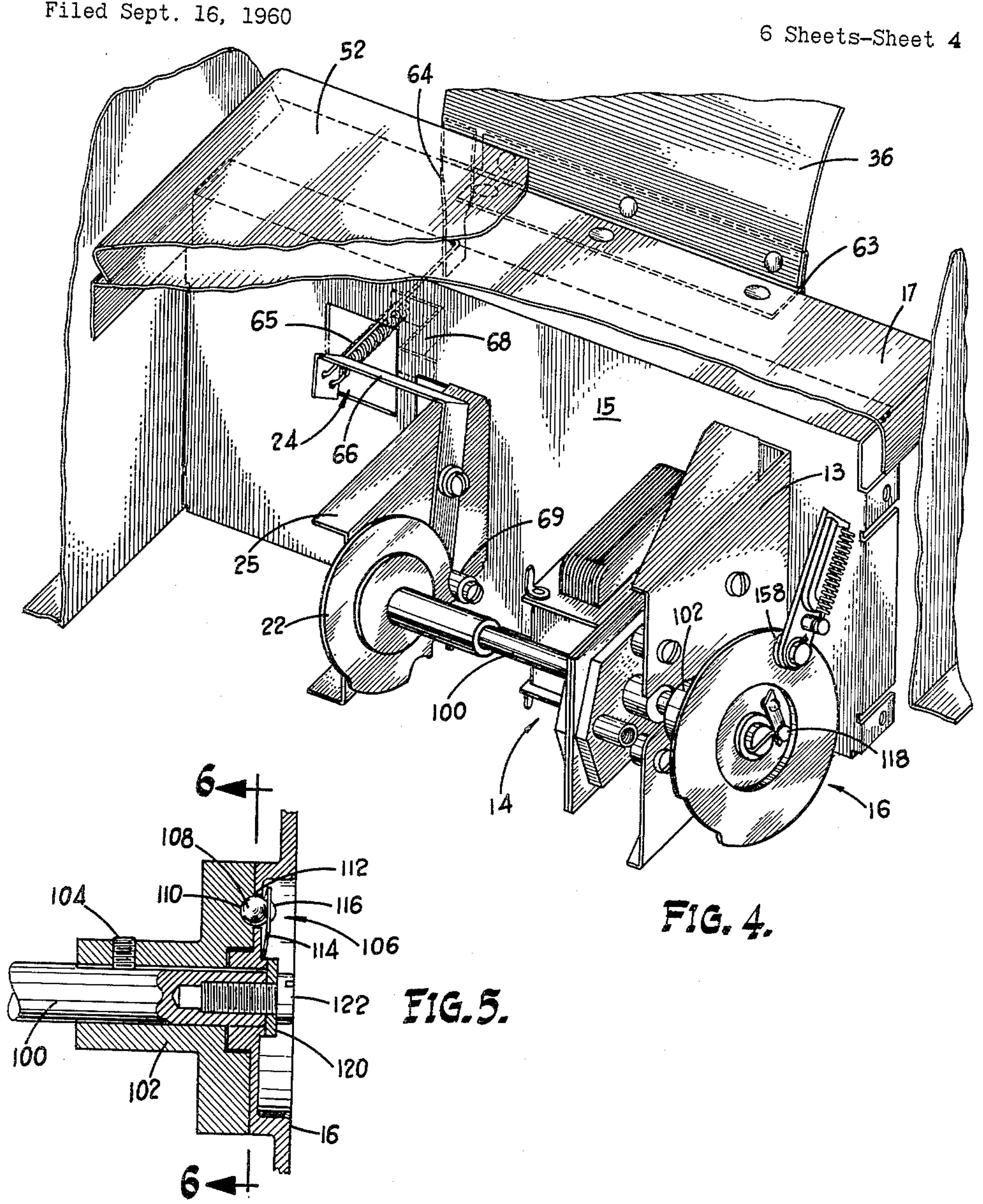
FIG. 4 is an enlarged fragmentary prespective view showing the copyloader drive means.
FIGS. 5 and 6 are respectively a sectional elevation view and an end view showing details of the improved clutch assembly.
Figure 6:
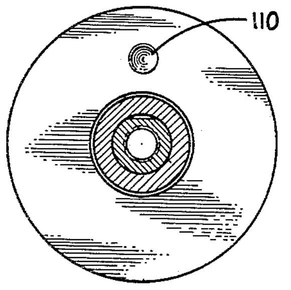
Figures 7, 8, 9, 10:
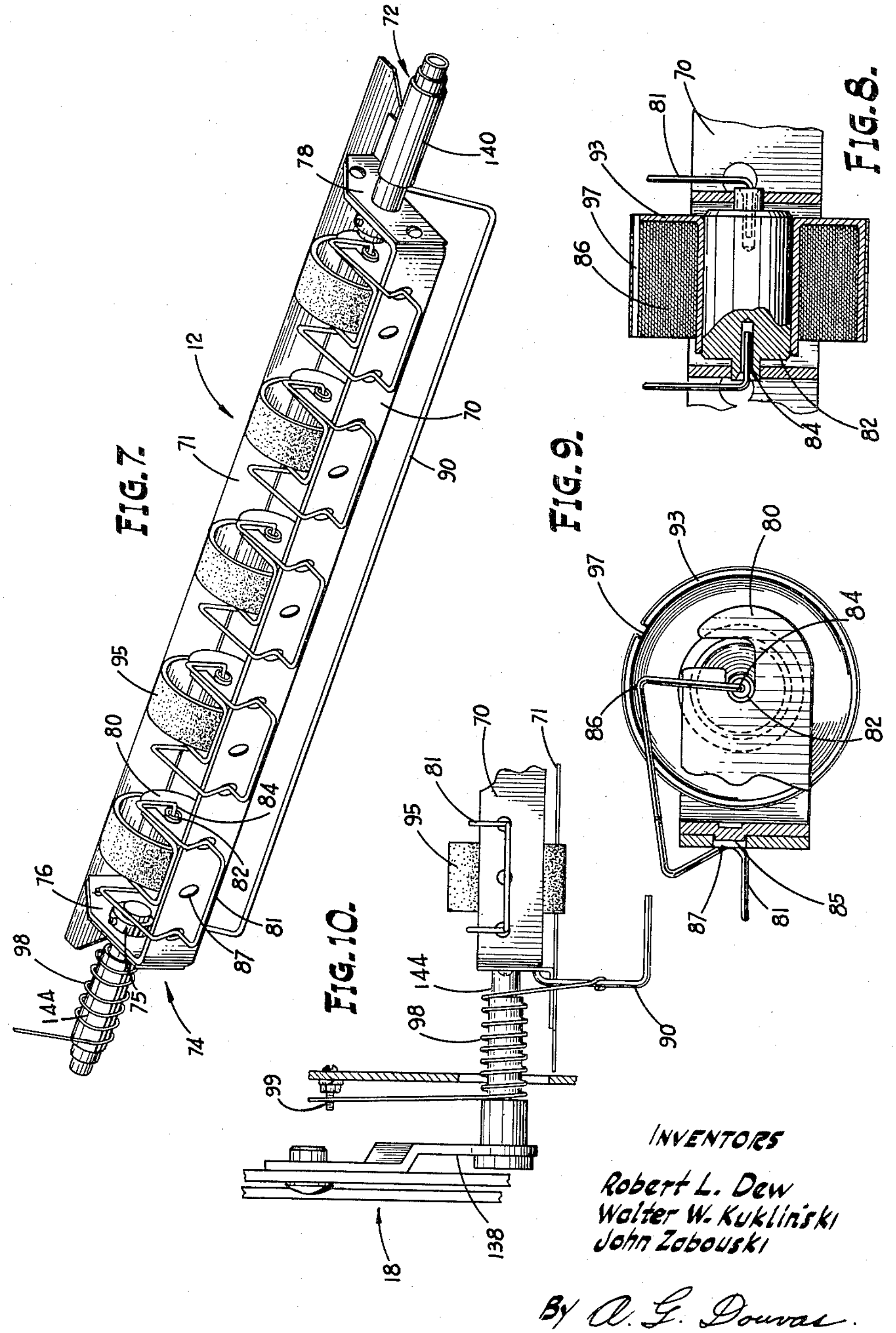

A motor and gear reducer assembly 14 (FIG. 4) operates the assembly 12 by means of a cam 16 and a pair of linkage assemblies 18 and 20. The assembly 14 is carried by a bracket 13 which in turn is carried by a transverse supporting wall 15 and a horizontal top wall 17.

A second cam 22 and a lever assembly 24 operated by the motor and gear reducer 14 periodically vibrate the assembly 10 to assure proper positioning of the paper therein in relation to the paper seizing assembly 12. The assembly 24 is carried by a bracket 25.

The assembly 10 includes a pair of side plates 30 and 32 and forward and rearward plates 34 and 36. The plates 34 and 36 are similarly curved to present concave surfaces facing the transmitter. These curved plates cause the stack of copy 42 to assume a similarly curved relationship as it progresses upwardly. This is important since the assembly 12 assumes differing positions longitudinally of the apparatus in different horizontal planes. This will be apparent below during the description of the apparatus 12, since it is mounted for arcuate movement about an axis to the rear of the assembly 10. The plates 34 and 36 are preferably curved so that each succeeding sheet in the copy 42 will be engaged at the same relative longitudinal position by the assembly 12.

The side plates 30 and 32 include horizontally disposed bottom sections 44 and 46 which are received under a flat rectangular plate 48. An adjustable screw 50 is provided for securing the plate 48 firmly to the shelf 52 of the cabinet. When the screw 50 is loosened, the sections 44 and 46 of the side plates may be moved transversely under the plate 48 for proper spacing in accordance with the width of the particular copy being fed to the machine.

When these side plates are properly adjusted, the screw 50 may be tightened to hold them in place. A guide plate 53 and the side plates 30 and 32 are provided respectively with a flange 54 and slots 56 and 58. This adds strength and rigidity to the assembly 10.

The plate 53 is bent upwardly at its rear end to form the plate 34. The plate 53 together with the plates 30, 32 and 34 is movable forwardly and rearwardly toward and away from the plate 36 for proper positioning in relation to the length of the copy 42. The mating flanged edge 60 of the plate 53 and edge 62 of the shelf 52 retain the assembly 10 on the cabinet structure.

The plate 36 is pivotally carried on a shaft 63. The shaft is carried by the horizontal top wall 17. An arm 64 is pivotal with and depends from the plate 36. A lever arm 65 of the assembly 24 is pivotally carried by an L-shaped pivot member 66 and is connected to the arm 64. A bias spring 67 anchored to bracket 68 pulls the top of the member 66 toward the bracket 68 and urges a roller 69 carried by the member into engagement with the cam 22.

Reference may be had to FIGS. 7–10 inclusive for a detailed description of the assembly 12. This assembly includes a bracket 70 of a generally U-shaped configuration. A paper guide 71 is secured at the free ends of the bracket. The ends of the bracket are supported by shaft and bearing assemblies 72 and 74. Bushings 75 hold the bracket 70 in place between the assemblies 72 and 74.

A plurality of masking tape holders 80 are positioned in spaced relation to each other between the sides 76 and 78 of the bracket 70. These holders are secured to the main bracket by spring clips 81. The holders 80 include U-shaped brackets 83 which are rearwardly directed. Each bracket 83 includes a projection 85 which is received in a guide aperture 87 in the bracket 70. The rounded portions 89 of the spring clips are also received in the guide apertures 87.

Each holder also includes a shaft 82 carried by the bracket 83. The free ends 84 of the spring clips project through apertures 91 in the shafts 82. A hollow spool 93 is rotatably carried by each shaft. A roll of masking tape 86 is received in each spool. A length 95 of masking tape is unwound, received through a peripheral slot 97 in the spool and applied to the outer periphery of the spool for displaying an outer periphery of adhesive material. When the adhesive character of the periphery is lost by reason of picking up lint, dust and the like, the portion forming the outer periphery is torn off and discarded and a new portion of fresh tape from the roll is similarly formed.

A generally U-shaped spring wire 90 depends from and is pivotally supported by the bracket 70. A helical spring 98 has one end secured to the wire 90 and the other free end thereof adapted for engagement with a screw 99.

The motor and gear reducer assembly 14 may be of any well known type, providing a suitable output speed at the shaft 100. The shaft 100 extends from either side of the gear reducer portion of the assembly. A hub 102 is secured to the right hand side of the shaft 100 (FIG. 4) by means of a set screw 104.

The cam 16 is retained on the shaft 100 by means of a bearing washer 120 and a machine screw 122.

The hub 102 drives the cam 16 by means of frictional engagement of their juxtaposed surfaces and by means of a ball and spring clutch assembly 106.

The assembly 106 includes a ball 108 received within an hemispherical recess 110 in the hub 102. The ball projects through a circular aperture 112 in the cam 16. A spring 114 having a concave depression 116 engages the ball and urges it into the recess 110. The spring 114 is suitably secured to the cam by a machine screw 118.

A switch 124 is secured to the cabinet by screws 127. The switch is actuated by means of the cam 16 and a cam follower arm 126 for a reason which will be described below with respect to FIG. 11.

Figure 1:
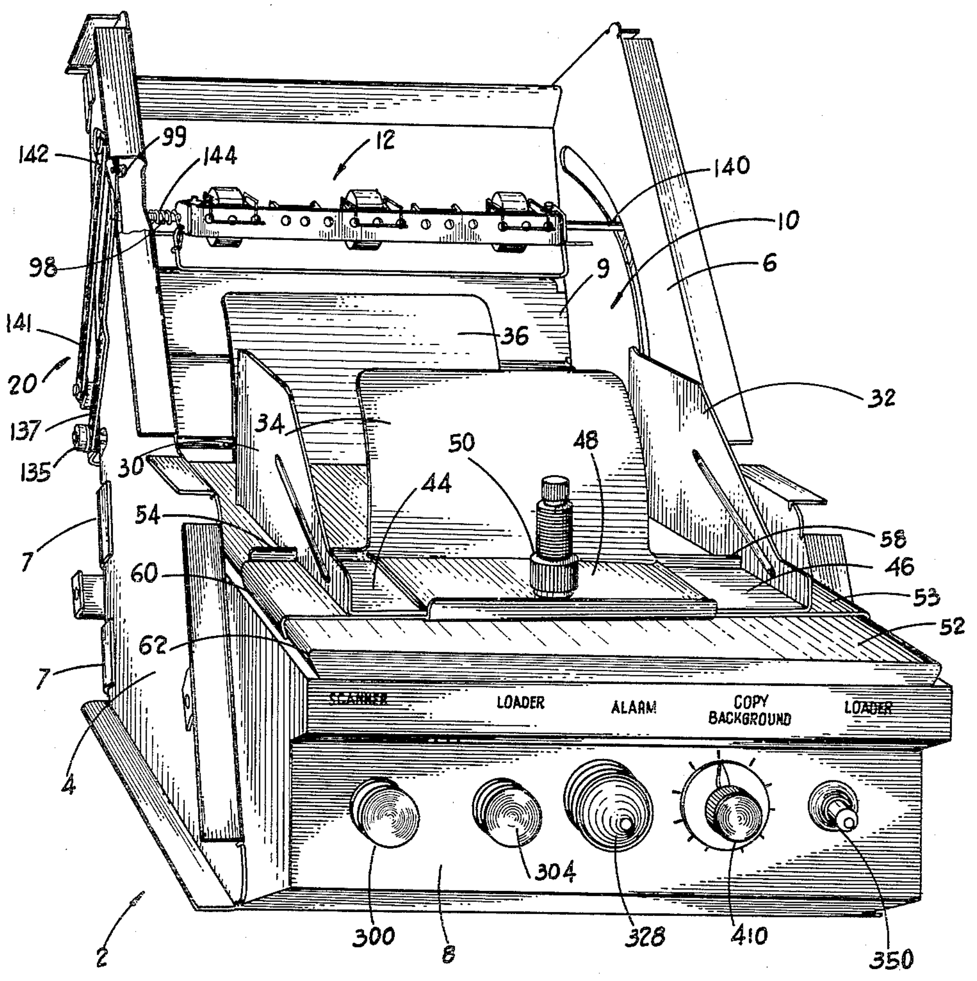
FIG. 1 is a perspective view of the improved copyloader.
Figure 2:
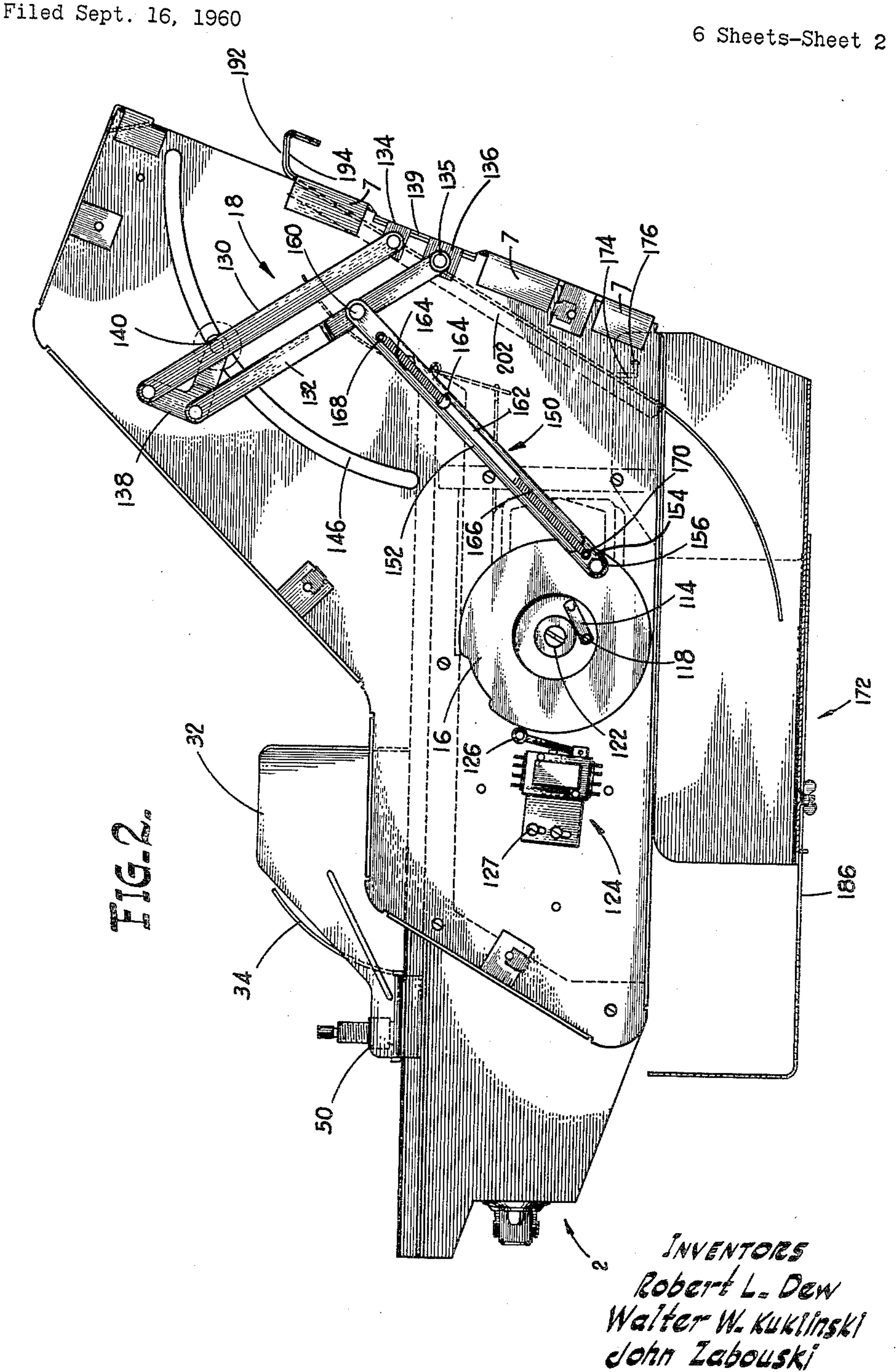
FIG. 2 is a side elevational view of the copyloader.

The cam 16 drives the assembly 12 by means of the linkage assembly 18. The assembly 18 includes a pair of parallel bars 130 and 132 (FIG. 2). The lower ends of the parallel bars are pivotally connected to lugs 134 and 136 on the back plate 9 of the cabinet. A common shaft 135 is provided for the bar 130 and a corresponding bar 137 in the assembly 20 for proper alignment.

The upper ends of the parallel bars are pivotally connected to an L-shaped operator arm 138. The arm 138 is suitably connected to a pivotal bushing 140 of the assembly 72 at one side of the paper seizing and releasing structure 12.

The linkage structure 20 on the side wall 4 includes a similar assembly including parallel bars 137 and 141 and an arm 142 supporting a pivotal bushing 144 which carries the other end of the assembly 12. An arcuate slot 146 is formed in the side wall 6 permitting movement of the bushing 140 along a predetermined path. A similar slot 148 on the side wall 4 similarly permits movement of the bushing 144.

The arm 132 is operatively connected to the cam 16 by means of a resilient link 150. The link 150 includes a pair of elongated adjacent arms 152 and 154. The arm 154 is rotatably secured to the cam by means of a pivot pin 156. A bearing washer 158 is interposed between the cam and the arm 154.

The arm 152 is suitably secured to the arm 132 by means of a pivot pin 160. The arm 152 includes a central elongated slot 162. A pair of bolts 164 are received through the slot 162 and are secured to the arm 154 by nuts (not shown). A helical spring 166 is secured to the arm 152 by means of a pin 168 and to the arm 154 by a pin 170. The pins 168 and 170 may be pressed into their respective arms and are headed to retain the ends of the spring 164. Thus it can be seen that the two arms 152 and 154 provide a resilient driving connection between the cam 16 and the arm 132.

Figure 3:
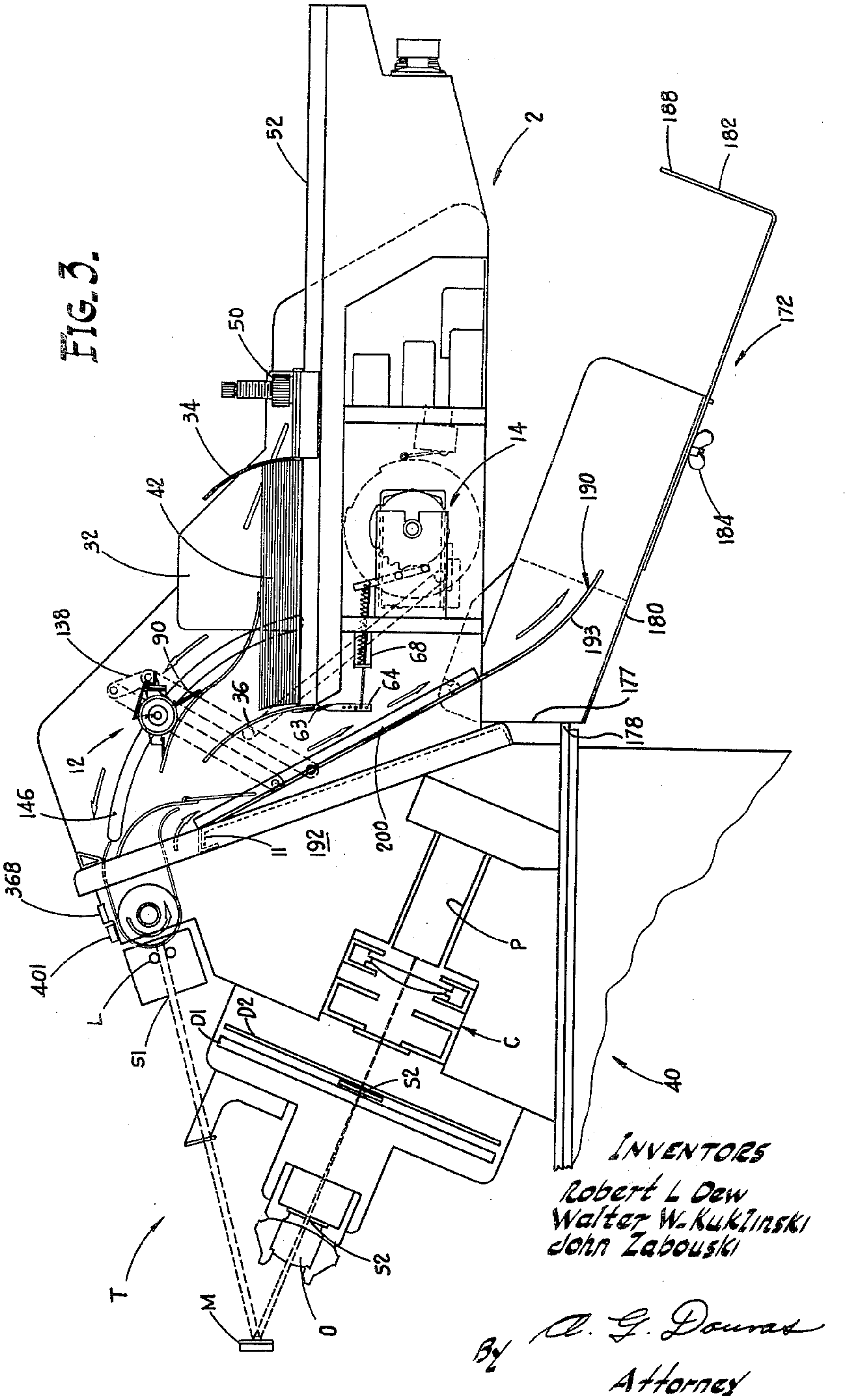
FIG. 3 is an elevational view of the opposite side of the copyloader, also diagrammatically showing certain of the transmitter components.

A copy tray or receptacle 172 is provided below the cabinet. The normal position of the receptacle is shown in FIG. 3. When the receptacle is in this inclined position, succeeding papers will fall one upon the other for easy removal by the operator at regular intervals.

The receptacle 172 is supported by the side walls 4 and 6. The sides of the receptacle include L-shaped apertures 174 through which headed pins 176 are received. The pins 176 are carried by the side walls 4 and 6. Once the pins are in place in the apertures 174, the receptacle is permitted to lower itself from the horizontal assembly position of FIG. 2 to the inclined position of FIG. 3, with the rear portion 177 abutting against a stop 178 on the transmitter.

The receptacle 172 includes a generally channel shaped section 180 and an L-shaped bracket 182 forwardly thereof. The bracket 182 is connected to the channel section by means of a wing bolt 184. The bracket 182 includes a central slot 186 for adjustable positioning of the upstanding flange 188 a sufficient distance from a paper chute 190 to provide for satisfactory positioning of the copy thereon.

The chute 190 is generally rectangular with an upper hook-shaped portion 192 for connection with the forward end of the transmitter and a sloping lower portion 193. The portion 192 fits on the portion 11 of the back plate and may be secured thereto by screws (not shown). The chute 190 also includes side panels 200 and 202 for properly guiding the paper to the receptacle 172.

FIG. 11 may be referred to for a description of the operating circuit for the improved copyloader. A first manually operable switch 300 is located on the front panel. The switch 300, when pulled closed, completes a circuit to the scanner equipment (not shown). At the same time, electrical connections are completed for energizing the lamp 302 indicating that the scanner equipment is turned on.

A second manually operable switch 304, also located on the front panel, is manually operated to complete a circuit for energizing the primary winding 306 of a step-down transformer 307. This circuit includes line conductor 308, contacts 310 of the switch 304, conductor 312, the winding 306, and the line conductor 314. Conductors 308 and 314 are connected across a 117-volt A.C. source (not shown).

The contacts 310 also complete a circuit for a thermal on-off switch 316. This circuit is established by way of conductor 308, contacts 310, conductor 312, contacts 318 of a relay 320, conductor 322, the bimetallic element 324 of the switch 316, the heater element 326 of the switch 316, and line 314. An alarm indicator lamp 328 is connected in series with contacts 330 in the switch 316, and the lamp and contacts are in parallel across the heater element 326. As a result, closing of the contacts 310 will result in lighting of the lamp 328.

When the switch 304 is actuated to close the contacts 310, a lamp 332 is energized by way of the secondary winding 334 of the transformer 307, conductor 336 and ground at 338.

When the switch 304 is actuated to close contacts 310, the motor 340 of a synchronous motor relay 342 will be energized over the same circuit as the transformer 307 with which it is in parallel. The relay 342 includes a cam 344 for actuating a pair of contacts 346. The synchronous motor relay 42 is a timer device which is used to periodically stop the copy feed loader and the facsimile scanner while reversing the electrical connections to the fluorescent lamps in the scanner. A reversing switch 349 is actuated by cam 348 driven by the synchronous motor 340 to reverse the lamp connections. The motor 340 may be geared to cycle the cams 344 and 348 in any desired time interval.

After a short time interval, contacts 346 close; and relay 356 is energized over a circuit including the secondary winding 334 of the transformer 307, the coil 360 of the relay 356, conductor 362, contacts 346 of the synchronous motor relay 342, conductor 364, contacts 366 of a loader paper sensing switch 368, and conductor 370.

The front panel is also provided with a third manually operable spring loaded switch 350. The switch 350 includes a pair of normally open contacts 352 which are closed while the switch 350 is momentarily in the depressed position. Closing of the contacts 352 causes the energization of relay 320.

Relay 320 is energized over a circuit including the line conductor 314, the winding 372 of relay 320, conductor 374, contacts 352, conductor 376, conductor 312, contacts 310, and line conductor 308.

When the relay 320 energizes, it closes contacts 382 which maintain relay 320 locked energized when the contacts 352 subsequently open. This holding circuit includes the line conductor 314, the coil 372 of the relay 320, conductor 374, contacts 382, conductor 384, a bimetal element 386 and contacts 388 of a thermal misfeed relay 390, conductor 312, contacts 310, and line conductor 308.

The motor 14 is also energized upon the closure of contacts 352 over a circuit including the line conductor 314, the motor 14, conductor 377, contacts 378 of the relay 356, contacts 352, conductors 376 and 312, contacts 310, and line conductor 308. Relay 320 maintains the motor energized by way of contacts 382, bimetal element 386, contacts 388, conductor 312, contacts 310 and the other line conductor 308.

Operation of the relay 320 also completes a circuit for energizing the thermal misfeed relay 390. This circuit extends from the line conductor 314, through contacts 392 of the relay 356, conductor 400, contacts 402 of the relay 320, conductor 404, the heater element 406 of the relay 390, conductor 312, contacts 310, and the other line conductor 308.

The front panel of the copyloader is provided with a rheostat 410 for adjusting the background of the scanner in a well known manner.

Contacts 125 of the switch 124 are connected in parallel with the contacts 366 of the paper sensing switch 368. It is the function of these contacts to assure that the motor 14 stops in the same position irrespective of the type of paper being loaded. For example, the paper sensing switch contacts will not be as rapidly actuated by thin onion skin copy as it will by heavy bond copy. Both the paper sensing switch 368 and the switch 124 must both be satisfied in order to stop the motor 14. The position of the switch 124 is adjustable by the use of slots and the screws 127 mounting same on the cabinet. Thus the contacts 125 of the switch 124 may be operated at a time when all paper should have assured operation of the paper sensing switch.

The operation of the copyloader will now be described. The switch 300 is actuated to start the scanner portion of the transmitter. After a short time delay to permit heating of the electronic components in the transmitter, the switch 304 is manually operated for energizing the relay 356 and the synchronous motor relay 342. In the event that the contacts 346 are open, the relay 356 operates after a short time delay. The synchronous motor relay 342 does not readjust itself to a zero position; and, therefore, the contacts 346 will usually be closed when the copyloader and transmitter are started.

The thermal on-off switch 316 will initiate the flashing of the alarm lamp 328. Relay 356 will prepare circuits for operating the motor 14 and the thermal misfeed relay 390.

The loader start switch 350 is then actuated to energize the relay 320. The relay 320 locks itself operated over its contacts 382 and completes the circuit for energizing the heater element 406 of the thermal misfeed relay 390 and the circuit for operating the motor 14.

The motor 14 starts the cyclical operation of the cam 16. As the cam begins to rotate, the link 150 begins the downward travel of the paper seizing assembly 12 by means of the parallel bar arrangement 18. The assembly 12 move in its arcuate path until it engages the uppermost sheet in the stack 42. The resilient link 150 will continue to urge the assembly 12 further in the downward direction. This increases the contact pressure of the rolls of masking tape on the uppermost sheet to assure good adhesion between the rolls and the sheet. The wire 90 is rotated to the position shown in FIG. 3.

As the cam 16 passes the position in which the assembly 150 tends to urge the paper seizing assembly 12 to its lowermost position, the assembly 150 begins to relax the force applied to the parallel bar assembly 18, and the paper seizing assembly 12 begins to move upwardly along its arcuate path. The uppermost sheet of copy is retained on the assembly 12 by means of the masking tape rolls.

The assembly 12 continues in its arcuate path until the leading edge of the sheet of copy is moved into the copy receiving chute of the transmitter. The sheet of copy will open the contacts 366 of the paper sensing switch 368. At about the same time the actuator arm 126 falls into the recess in the cam 16 to open the contacts 125 of the switch 124.

When both of the contacts 366 and 125 are open, the relay 356 will be de-energized. De-energization of the relay 356 opens contacts 392 in the circuit of the heater element 406 of the thermal misfeed relay. Contacts 378 of the relay 356 open circuit to the motor 14, and the motor stops. By this time the paper feed roller of the transmitter will have seized the sheet of copy and continued its movement through the transmitter for scanning.

As the leading edge of the sheet of copy approaches the paper chute of the transmitter as described above, the free end of the helical spring 98 will engage the screw 99 to urge the wire 90 downwardly against the sheet of copy. This will have the tendency of stripping the copy slowly from the rolls of masking tape for simple removal by the paper drive roll of the transmitter.

As soon as the trailing edge of the sheet of copy passes the paper sensing switch 368, the contacts 366 close to again complete the circuit for the relay 356. The relay 356 energizes again completing the circuits to the heater element of the thermal misfeed relay and the motor 14. The sheet of copy after being scanned in the transmitter falls into the chute 200 and thence into the tray 172. The cam 22 and the lever asembly 24 vibrate the plate 36 three times to keep the stack aligned with the path of the assembly 12 and to return sheets of copy which occasionally adhere to the sheet seized by the assembly 12. These sheets adhere due to static and usually fall on the plate 36 shortly after the top sheet is raised from the stack.

This sequence of operations is cyclically repeated for removal of succeeding sheets from the stack of copy for movement into the transmitter for scanning.

When the stack of copy has been completely exhausted or if one of the sheets is improperly fed, the contacts 366 of the paper sensing switch 368 will not be opened during the succeeding cycles. As a result, the relay 356 will not be restored as the motor 14 operates the copyloader through its normal cycles. After three cycles of operation of the copyloader without a de-energization of the relay 356, the thermal misfeed relay 390 will open its contacts 388. Opening of contacts 388 restores the relay 320. When the relay 320 restores, it opens contacts 402 to open the circuit for the heater of the misfeed relay 390 and opens contacts 382 to restore itself as well as to de-energize the motor 14. It also recloses the contacts 318, and the thermal on-off switch 316 will cycle the alarm lamp 328.

In the event that one of the assemblies 12 or 18 become jammed or overloaded, the ball 108 will ride out of the recess 110 to prevent overloading of the motor 14. When the jamming or overloading is corrected, the ball will be received in the recess when they are again in angular alignment. The cyclical operation of the copyloader will then continue as described above.

While there has been described what is believed to be the preferred embodiment of the invention, it will be appreciated that various changes and modifications may be made therein; and it is contemplated to cover in the appended claims all such changes and modifications as fall within the true spirit and scope of the invention.

What is claimed is:

1. A copyloader for facsimile transmitters comprising a copy storage rack, an arm having paper seizing adhesive surfaces, means mounting the arm for movement from the rack to the transmitter for feeding successive pieces of copy from the rack to the transmitter, a prime mover for operating the arm and means associated with the transmitter and operable responsive to each successive piece of copy fed to the transmitter for synchronizing said prime mover with the movement of said successive pieces of copy through the transmitter.

2. A copyloader for facsimile transmitters comprising a copy storage rack, an arm having paper seizing adhesive surfaces, means mounting the arm for movement from the rack to the transmitter for feeding successive pieces of copy from the rack to the transmitter, a prime mover for operating the arm and means associated with the transmitter and operable responsive to each successive piece of copy fed to the transmitter for synchronizing said prime mover with the movement of said successive pieces of copy through the transmitter, and means including a ball and spring clutch connecting the prime mover to the arm.

3. A copyloader for facsimile transmitters comprising a copy storage rack, an arm having paper seizing adhesive surfaces, means mounting the arm for movement from the rack to the transmitter for feeding successive pieces of copy from the rack to the transmitter, a prime mover for operating the arm and means associated with the transmitter and operable responsive to each successive piece of copy fed to the transmitter for synchronizing said prime mover with the movement of said successive pieces of copy through the transmitter, and means including a cam operated by the prime mover vibrating the rack to position the copy for proper seizure by the adhesive surfaces.

4. A copyloader for facsimile transmitters comprising a copy storage rack, an arm having paper seizing adhesive surfaces, means mounting the arm for reciprocable arcuate movement from the rack to the transmitter for feeding successive pieces of copy from the rack to the transmitter, a prime mover for operating the arm and means associated with the transmitter and operable responsive to each successive piece of copy fed to the transmitter for synchronizing said prime mover with the movement of said successive pieces of copy through the transmitter, and a resilient drive link connecting the prime mover and the arm.

5. A copyloader for facsimile transmitters comprising a copy storage rack having curved forward and rear guide plates, an arm having paper seizing adhesive surfaces, means mounting the arm for reciprocable arcuate movement from the rack to the transmitter in generally concentric relation with the plates for feeding successive pieces of copy from the rack to the transmitter, a prime mover for operating the arm and means associated with the transmitter and operable responsive to each successive piece of copy fed to the transmitter for synchronizing said prime mover with the movement of said successive pieces of copy through the transmitter, and a resilient drive link connecting the prime mover and the arm.

6. A copyloader for facsimile transmitters comprising a storage rack adapted to receive vertically stacked sheets of copy, an arm having means for picking up sheets of copy from the rack one at a time, pairs of parallel bars positioned on either side of the arm, means pivotally mounting the bars at adjacent ends thereof spaced from the arm, a bracket pivotally secured to the opposite ends of each pair of bars and pivotally supporting the arm for movement in a generally arcuate path from a position above to a position within the storage rack, a prime mover, and an arm secured at one end to one of the parallel bars and connected at its other end for movement in a generally circular path by the prime mover, whereby cyclical movement of the other end of the last-mentioned arm in its circular path will cause reciprocable movement of the first mentioned arm in its arcuate path for picking up sheets of copy from the storage rack one by one for delivery to a facsimile transmitter.

7. A copyloader for facsimile transmitters comprising a storage rack adapted to receive vertically stacked sheets of copy, an arm having means for picking up sheets of copy from the rack one at a time, pairs of parallel bars positioned on either side of the arm, means pivotally mounting the bars at adjacent ends thereof spaced from the arm, a bracket pivotally secured to the opposite ends of each pair of bars and pivotally supporting the arm for movement in a generally arcuate path from a position above to a position within the storage rack, a prime mover, cam means operated by the prime movement periodically vibrating the rack to properly position the copy, and an arm secured at one end to one of the parallel bars and connected at its other end for movement in a generally circular path by the prime mover, whereby cyclical movement of the other end in its circular path will cause reciprocable movement of the first-mentioned arm in its arcuate path for picking up sheets of copy from the storage rack one by one for delivery to a facsimile transmitter.

8. A copyloader for facsimile transmitters comprising a storage rack adapted to receive vertically stacked sheets of copy, an arm having means for picking up sheets of copy from the rack one at a time, pairs of parallel bars positioned on either side of the arm, means pivotally mounting the bars at adjacent ends thereof spaced from the arm, a bracket pivotally secured to the opposite ends of each pair of bars and pivotally supporting the arm for movement in a generally arcuate path from a position above to a position within the storage rack, a prime mover, and a resilient drive link secured at one end to one of the parallel bars and connected at its other end for movement of the other end in a generally circular path by the prime mover, whereby cyclical movement of the other end in its circular path will cause reciprocable movement of the arm in its arcuate path for picking up sheets of copy from the storage rack one by one for delivery to a facsimile transmitter.

9. A copyloader for facsimile transmitters comprising a storage rack having curved forward and rear guide plates adapted to receive vertically stacked sheets of copy, an arm having means for picking up sheets of copy from the rack one at a time, pairs of parallel bars positioned on either side of the arm, means pivotally mounting the bars at adjacent ends thereof spaced from the arm, a bracket pivotally secured to the opposite ends of each pair of bars and pivotally supporting the arm for movement in a generally arcuate path generally concentric with the guide plates from a position above to a position within the storage rack, a prime mover, and a resilient drive link secured at one end to one of the parallel bars and connected at its other end for movement of the other end in a generally circular path by the prime mover, whereby cyclical movement of the other end in its circular path will cause reciprocable movement of the first mentioned arm in its arcuate path for picking up sheets of copy from the storage rack one by one for delivery to a facsimile transmitter.

10. A copyloader for facsimile transmitters comprising a storage rack adapted to receive vertically stacked sheets of copy, an arm having rotatably mounted rolls of masking tape for picking up sheets of copy from the rack one at a time, pairs of parallel bars positioned on either side of the arm, means pivotally mounting the bars at adjacent ends thereof spaced from the arm, a bracket pivotally secured to the opposite ends of each pair of bars and pivotally supporting the arm for movement in a generally arcuate path from a position above to a position within the storage rack, a prime mover, and an arm secured at one end to one of the parallel bars and connected at its other end for movement in a generally circular path by the prime mover, whereby cyclical movement of the other end of the last-mentioned arm in its circular path will cause reciprocable movement of the first mentioned arm and its rolls of tape in their arcuate path for picking up sheets of copy from the storage rack one by one for delivery to a facsimile transmitter.

11. A copyloader for facsimile transmitters comprising a storage rack adapted to receive vertically stacked sheets of copy, an arm having rotatably mounted rolls of masking tape for picking up sheets of copy from the rack one at a time, pairs of parallel bars positioned on either side of the arm, means pivotally mounting the bars at adjacent ends thereof spaced from the arm, a bracket pivotally secured to the opposite ends of each pair of bars and pivotally supporting the arm for movement in a generally arcuate path from a position above to a position within the storage rack, a prime mover, an arm secured at one end to one of the parallel bars and connected at its other end for movement in a generally circular path by the prime mover whereby cyclical movement of the other end of the last mentioned arm in its circular path will cause reciprocable movement of the first mentioned arm and its rolls of tape in their arcuate path for picking up sheets of copy from the storage rack one by one for delivery to a facsimile transmitter, and means carried by the first mentioned arm urging the sheets of copy away from adhesive engagement with the rolls as the sheets are delivered to the transmitter.

12. In a copyloader for facsimile transmitters having means for storing sheets of copy one upon the other, means for seizing succeeding sheets of copy one at a time and means including a prime mover for operating the seizing means in cyclical fashion for feeding copy from the storage rack to the transmitter, a control circuit comprising circuit means effective for operating the prime mover, and a switch in the transmitter operable by the movement of copy through the transmitter for rendering the circuit means ineffective only while copy moves through the transmitter.

13. In a copyloader for facsimile transmitters having means for storing sheets of copy one upon the other, means for seizing succeeding sheets of copy one at a time and means including a prime mover for operating the seizing means in cyclical fashion for feeding copy from the storage rack to the transmitter, a control circuit comprising circuit means effective for operating the prime mover, and means including a switch controlled by the prime mover and a switch associated with the transmitter sensing the movement of copy through the transmitter rendering the circuit means ineffective only while copy moves through the transmitter.

14. In a copyloader for facsimile transmitters having means for storing sheets of copy one upon the other, means for seizing succeeding sheets of copy one at a time and means including a prime mover for operating the seizing means in cyclical fashion for feeding copy from the storage rack to the transmitter, a control circuit comprising circuit means for operating the prime mover, a manually operable switch preparing the circuit means for operation of the prime mover, a second manually operable switch rendering the circuit means effective to operate the prime mover, and switch means for rendering the circuit means ineffective while copy moves through the transmitter.

15. In a copyloader for facsimile transmitters having means for storing sheets of copy one upon the other, means for seizing succeeding sheets of copy one at a time and means including a prime mover for operating the seizing means in cyclical fashion for feeding copy from the storage rack to the transmitter, a control circuit comprising circuit means effective for operating the prime mover, switch means associated with the transmitter sensing the movement of copy through the transmitter for rendering the circuit means ineffective while copy moves through the transmitter, and an alarm circuit operated by the circuit means in the event that the switch means fails to sense succeeding sheets of copy within a predetermined time interval.

16. In a copyloader for facsimile transmitters having fluorescent lamps and reversable electrical connections theresto, said copyloader having means for storing sheets of copy one upon the other, means for seizing succeeding sheets of copy one at a time and means including a prime mover for operating the seizing means in cyclical fashion for feeding copy from the storage rack to the transmitter, a control circuit comprising circuit means effective for operating the prime mover, switch means rendering the circuit means ineffective while copy moves through the transmitter and means periodically rendering the circuit means ineffective while electrical connections to the fluorescent lamps in the transmitter are being reversed.

References Cited in the file of this patent

UNITED STATES PATENTS

| | | |
|---|---|---|
| 672,208 | Dvorak | Apr. 16, 1901 |
| 1,166,004 | Reifsnyder et al. | Dec. 28, 1915 |
| 1,236,892 | Wilson | Aug. 14, 1917 |
| 2,811,353 | Alden | Oct. 29, 1957 |
| 2,961,947 | Springer | Nov. 29, 1960 |